United States Patent [19]
Merrifield

[11] 4,345,775
[45] Aug. 24, 1982

[54] AUTOMATIC STEERING SYSTEM FOR A TOWED VEHICLE

[76] Inventor: Donald V. Merrifield, 6614 Robinhood La., Huntsville, Ala. 35806

[21] Appl. No.: 162,194

[22] Filed: Jun. 23, 1980

[51] Int. Cl.³ .............................................. B62D 13/06
[52] U.S. Cl. .................................... 280/443; 280/474; 280/DIG. 9; 280/DIG. 14
[58] Field of Search ........ 280/443, 444, 445, DIG. 14, 280/DIG. 9, 426, 474

[56] References Cited

U.S. PATENT DOCUMENTS

| | | | |
|---|---|---|---|
| 2,533,553 | 12/1950 | Burns | 280/443 |
| 2,929,642 | 3/1960 | Dinkel et al. | 280/445 X |
| 2,949,317 | 8/1960 | Zaha | 280/445 X |
| 3,033,593 | 5/1962 | Zaha | 280/DIG. 14 |
| 3,114,563 | 12/1963 | Pietroroia | 280/445 |
| 3,211,467 | 10/1965 | Siddall | 280/445 X |
| 3,212,793 | 10/1965 | Pietroroia | 280/443 |
| 3,291,503 | 12/1966 | De Lay | 280/443 X |
| 3,312,480 | 4/1967 | Greenstreet | 280/443 |
| 3,322,439 | 5/1967 | Le Mmon | 280/445 X |
| 3,853,330 | 12/1974 | Hanaoka | 280/445 X |
| 4,192,525 | 3/1980 | Clark | 280/443 |

Primary Examiner—Joseph Paul Brust
Attorney, Agent, or Firm—C. A. Phillips

[57] ABSTRACT

An automatic steering system for a towed vehicle, or trailer, wherein the wheels of the trailer are steered while backing by means of a lockable, in length, rod extending longitudinally from a towing vehicle, the rod being positioned to the side of a towing connection.

5 Claims, 3 Drawing Figures

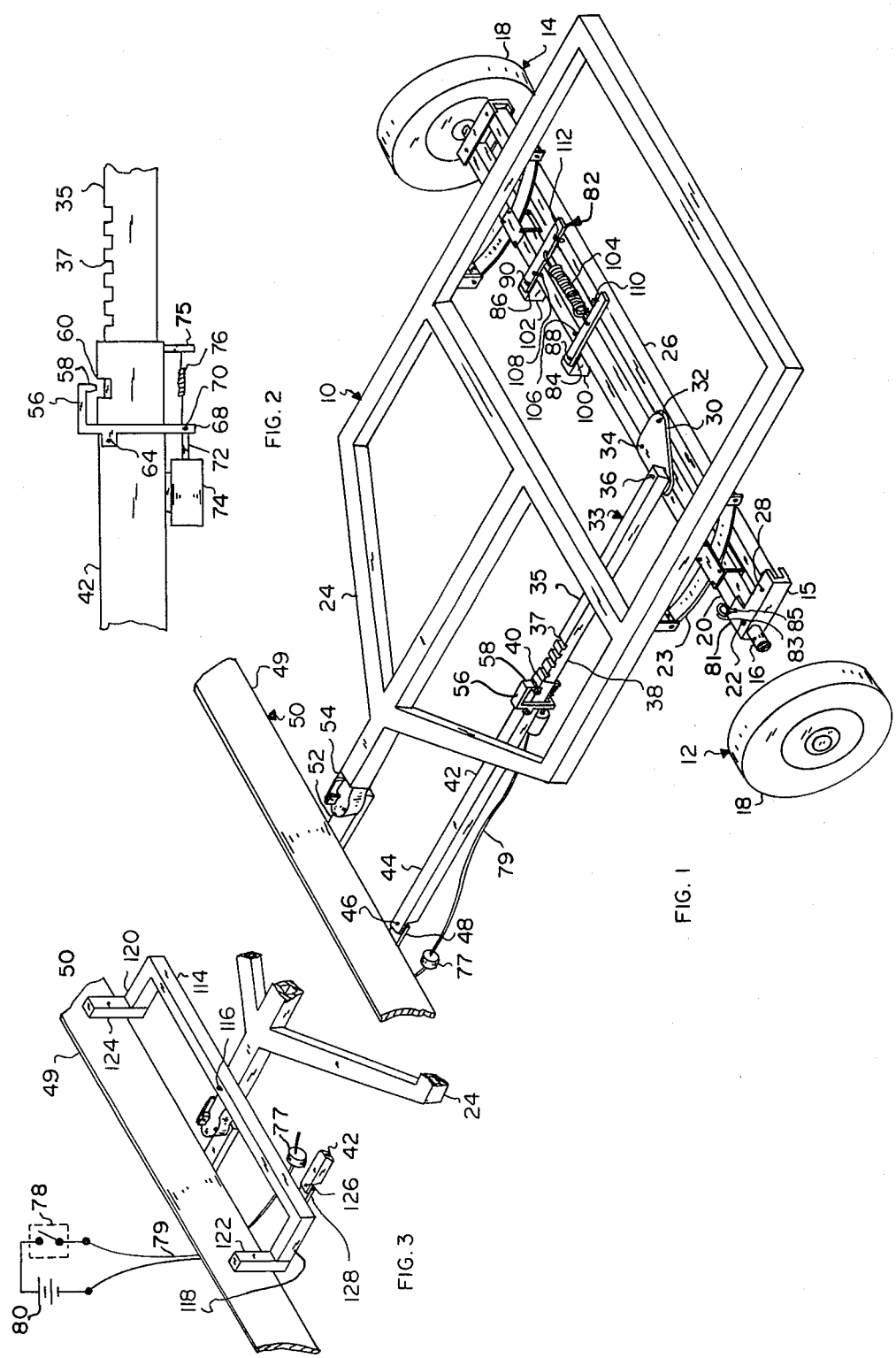

AUTOMATIC STEERING SYSTEM FOR A TOWED VEHICLE

TECHNICAL FIELD

This invention relates to towed vehicles, and particularly to a steering system for such a vehicle for use while backing.

BACKGROUND ART

A familiar difficulty that occurs in the backing of towed automotive trailers is that of jackknifing—the tendency for the trailer axis to yaw with respect to the towing motor vehicle. In order to minimize jackknifing and cause the trailer to move in a desired direction, the vehicle operator must use the proper sequence of reverse steering maneuvers. If the operator is skilled in this procedure, and if there is adequate room to perform the vehicle steering maneuvers, the trailer can usually be backed satisfactorily. However, if the operator is not skilled in trailer backing, or if the trailer is shorter than the vehicle, the backing process can be quite tedious and time-consuming, particularly if the trailer is to be backed into a precise particular location. Also, if there is inadequate space available for maneuvering the vehicle (due to other vehicles, buildings, curbs, trees, structures, etc.), it may be virtually impossible to back the trailer as desired. Further, if the operator cannot see the trailer adequately, his backing accuracy can be impaired even if he is highly skilled in trailer handling, resulting in a most difficult and time-consuming process.

While the applicant is unaware of any steering systems available for trailers, it appears that a number have been described in the patent art. Of these, U.S. Pat. No. 3,312,480 is perhaps the most pertinent patent of those examined. This patent describes the control of a pair of steerable wheels of a trailer through a cam which has two basic positions of operation which are selected by a castor wheel, which assumes a first position when the towing movement is forward, and a second position when movement is backward. Steering is then effected by a diagonally positioned rod coupled through a specially configured cam to a conventional type tie rod connecting the steerable wheels, the rod being coupled to the rear of the towing vehicle at a point to the side of the basic towing connection between the towing and towed vehicles.

Significantly, the system of U.S. Pat. No. 3,312,480 steers a towed vehicle along a greater arc than that of the towing vehicle. Since it is the arc of the towing vehicle that is controlled by the operator, this disparity is deemed objectionable. Further, the system of this patent is a full-time system, effecting steering while a vehicle is moving in a forward direction as well as in a backward direction. Forward movement is typically at highway speeds wherein trailer steering can create instabilities that may be dangerous.

DISCLOSURE OF THE INVENTION

In accordance with this invention, steerable wheels of a trailer are connected together conventionally by a tie rod. The tie rod is laterally moved to effect steering by a lever or crank which is rotated by a rod assembly pivotally coupled to the rear of the towing vehicle. This rod assembly is positioned parallel to the front/back axis of the trailer and at an off-center location. The trailer is actually towed by a conventional center line connection, and steering is effected by virtue of the difference in proximity of the towing vehicle and trailer at the off-center location of the steering connection. The steering rod assembly is formed of two rod members which are locked together when steering is to be effected, as when backing, and are unlocked, enabling them to move relatively when steering is undesired, as when the trailer is being towed forward on a highway.

BRIEF DESCRIPTION OF THE DRAWINGS

FIG. 1 is a perspective view, partially exploded, of an embodiment of the present invention.

FIG. 2 is a broken side view of a detail of construction.

FIG. 3 is a partial pictorial view of a modified form of the invention.

BEST MODE FOR CARRYING OUT THE INVENTION

Referring now to the drawings, and initially to FIG. 1, trailer 10 is equipped with steerable wheel assemblies 12 and 14, each of these including a hub member 15 holding a stub axle 16 supporting a wheel 18, the wheel assemblies each being pivotally supported on fixed axle 20 by a pin 22. Fixed axle 20 is conventionally supported through leaf springs 23 on trailer frame 24.

Tie rod 26, pivotally connecting hub members 15 by pin 28, is laterally movable to effect steering of wheels 18 as a lever functioning bell crank 30 is rotated, the tie rod and bell crank being pivotally connected by pin 32. Bell crank 30 is pivotally mounted by pin 34 on fixed axle 20, and its rotation is effected by steering rod assembly 33 through steering rod 35 pivotally connected to bell crank 30 by pin 36.

Steering rod 35 includes a series of gear teeth 37 located along an end region 38. End region 38 telescopes into end 40 of rod extension 42, forming a second portion of steering rod assembly 33. The opposite end 44 of rod extension 42 is pivotally connected by pin 46 to steering support member 48 attached to the rear or bumper 49 of towing vehicle 50. Steering support member 48 is positioned to the side of centrally positioned conventional towing ball assembly 52 (by 20 to 25 inches), which supports conventional towing arm assembly 54 of frame 24 of the trailer.

Rod extension 42 and steering rod 35 are selectively interlocked by L-shaped gear locking member 56 pivotally supported on rod extension 42 and having a turned-in end 58 adapted to be moved through an opening 60 of rod extension 42 (FIG. 2) and to then engage between gear teeth 37 and thereby interlock steering rod 35 and rod extension 42. Locking member 56 is pivotally supported by pin 64 attached to rod extension 42, and the end 68 of its long side is pivotally connected by pin 70 to arm 72 of solenoid 74 and to bias spring 76.

With solenoid 74 unpowered, bias spring 76, connected to support block 75 on rod extension 42, functions to bias gear locking member 56 in a position wherein locking member 56 is rotated counterclockwise, and thus end 58 is moved out of engagement with gear teeth 37.

Locking member 56 is pivotally connected by pin 70 to the armature of solenoid 74, and thus when solenoid 74 is energized, gear locking member 56 rotates clockwise so that steering rod 35 and extension 42 are locked together.

Solenoid 74 is powered through cable 79 leading to towing vehicle 50 through connector 77. A switch 78 in towing vehicle 50 couples power from battery 80 of the vehicle through cable 79 and thus to solenoid 74. If desired, the solenoid can be powered directly from the back-up light circuit of the vehicle.

Since the steering system is used only during backing, the switch would normally be open and solenoid 74 would not be energized during forward operation. In such case, steering rod 35 and rod extension 42 are not then locked together, and steering rod 35 is freely movable inward and outward with respect to rod extension 42. Thus, bell crank 30 is not rotated to effect any movement of tie rod 26, and wheels 18 are biased to a neutral, non-steering, position, biasing being effected by steering bias assembly 82.

Bias assembly 82 includes a pair of arms 84 and 86 pivotally mounted by pins 88 and 90 to support blocks 100 and 102 on fixed axle 20. A spring 104 connects arms 84 and 86 and biases them against four posts, posts 106 and 108 on fixed axle 20, and posts 110 and 112 on tie rod 26, as shown. In this fashion, tie rod 26 is biased to a fixed lateral position wherein wheels 18 are aligned for straight ahead travel of trailer 10.

To effect steering of trailer 10 for backing, vehicle 50 and trailer 10 would be first oriented to a desired starting track, e.g., with the two positioned along a straight line. Then solenoid 74 would be operated "on" by switch 78 to thereby operate gear locking assembly 56 (to the position shown) to lock the length of steering rod assembly 33. With this done, and in response to the steered turning of towing vehicle 50 as it is backed, steering rod assembly 33 is moved longitudinally in accordance with steering, and thereby rotating bell crank 30, to laterally move tie rod 26 and thus steer wheels 18. Significantly, the steering path is virtually that of the towing vehicle.

When it is desired to move forward again, solenoid 74 is de-energized, steering rod 35 and rod extension 42 are unlocked, and spring bias assembly 82 returns the steering system to a neutral position, with wheels 18 aimed parallel with the front-to-back lines of trailer 10.

To further maintain the steering stability of the trailer during forward highway travel, and as a safety feature, a position locking flange 81 extends from one of hub members 15, and a locking pin 83 is inserted through an opening 85 in the flange and then through axle 20.

FIG. 3 illustrates a modification of the system shown in FIG. 1 wherein, instead of a rod extension 33 being attached directly to vehicle 50, it is attached to a U-shaped frame 114 which is pivotally connected via pin 116 to frame 24. End regions 118 and 120 on U-shaped frame 114 have bumper engaging members 122 and 124, typically having rubber bumper engaging surfaces (not shown) which would contact bumper 49 of vehicle 50 to prevent the scratching of or otherwise damage to the bumper. Rod extension 42 is attached via a pin 126 to support 128 on frame 114. The operation of the modified system shown in FIG. 3 is basically the same as for the system shown in FIG. 1. The difference is that steering components are coupled by movement of U-shaped frame 114 which follows the orientation of the towing vehicle by responding to the direction of orientation of bumper 49.

When needed for stability, a radius rod support may be pivotally connected between a point on frame 24 and either or both of steering rod 35 and rod extension 42.

A further feature of the invention is that it provides for overload protection of the steering linkage of the trailer. In the event that wheel assemblies 12 and 14 become turned such that they reach their travel limit and tend to cause overloading of steering rod 35, the turned-in end 58 of gear locking member 56 is tapered so that it is wedged out of engagement with gear teeth 37. The taper angle is selected so as to permit overload relief at a preset steering force greater than encountered in normal steering. Alternately, gear teeth, or a rack, 37 may provide tapered wall surfaces, or both end 58 and the gear teeth may be tapered. The release force required to disengage rod 35 and rod extension 42 will decrease as a function of increase of such a taper and increase as a function of the force applied by solenoid 74, as diminished by spring 76.

In summary, the present invention provides a relatively simple but positive steering system for towed vehicles of the type having a single axle. It is capable of being accurately steered to track the path steered by the towing vehicle which is, of course, the path readily determinable by the operator of a vehicle. Thus, the invention enables precise control of the positioning of a towed vehicle. When the steering system is not employed, it is readily disengaged, and the towed vehicle is adapted for normal forward movement at highway speeds without any effect from the trailer steering assembly.

I claim:

1. An automatic steering system for steering a two-wheeled towed vehicle when backed, comprising:
   a frame and a pair of wheel assemblies positioned on opposite sides of said frame, and said frame being pivotally connectible at a central region of one end, a front end, of said frame to a central point of the rear of a towing vehicle; and
   a steering axle assembly extending laterally across said frame and supporting said wheel assemblies, and comprising:
   a fixed axle member fixedly attached across said frame,
   a hinged member pivotally supported about a vertical axis at each end of said fixed axle, and each hinged member supporting, about a generally horizontal axis, a said wheel assembly,
   a steering axle member spaced from and lying generally parallel to said fixed axle member and pivotally attached at each end, about a generally vertical axis, to a said hinged member,
   spring bias means for generally biasing said steering axle in a fixed longitudinal position with respect to said fixed axle member, whereby said wheel assemblies are biased to effect straight direction steering of said towed vehicle,
   operating lever means pivotally connecting said fixed and steering axle members about generally vertical axes, and whereby rotation of said lever arm effects steering of said wheel assemblies,
   steering control means comprising an extensible steering arm extending in a front-to-back direction with respect to said frame and positioned to the side of a general front-to-back axis of said frame and pivotally connected in one end region of said lever means and pivotally interconnectible at an opposite end region of a said towing vehicle, and
   control means for selectably locking said steering arm in a selected length position,
   whereby, with said steering arm freely extensible, said lever arm is not operated as said towed vehicle is towed in a forward direction; and, upon the locking of said steering arm in a selected length position, said steering arm operates said lever arm and effects steering coordinate with the direction of movement of a towing vehicle, enabling precise backing of the towed vehicle along a track determined by the steering of the towing vehicle.

2. An automatic steering system as set forth in claim 1 wherein said control means comprises solenoid means responsive to an electrical input for selectively locking said steering arm in a selected length position.

3. An automatic steering system as set forth in claim 2 wherein said steering arm comprises first and second telescopic arm members selectively locked together by said solenoid means.

4. An automatic steering system as set forth in claim 3 wherein:
one of said arm members includes a series of generally gear-shaped slots extending longitudinally along it;
the other said arm member includes a locking tab adapted to be operated into one of said slots by the operation of said solenoid means; and
at least one interlocking surface between said arm members is tapered.

5. An automatic steering system as set forth in claim 3 further comprising manual locking means supported by said frame for selectively locking said steering axle member into a fixed lateral position.

* * * * *